(12) United States Patent
Peeters et al.

(10) Patent No.: US 6,593,877 B2
(45) Date of Patent: Jul. 15, 2003

(54) METHOD FOR DETERMINING THE POSITION OF A TRANSMITTING BEACON

(75) Inventors: Bart Peeters, Delft (NL); Jörg Herbert Hahn, Oegstgeest (NL); Giuliano Gatti, Wassenaar (NL); Igor Stojkovic, Noordwijk (NL); Boudewijn Ambrosius, Zoetermeer (NL); Hans Van der Marel, Delft (NL)

(73) Assignee: Agence Spatiale Europeenne, Paris (FR)

( * ) Notice: Subject to any disclaimer, the term of this patent is extended or adjusted under 35 U.S.C. 154(b) by 0 days.

(21) Appl. No.: 10/125,510

(22) Filed: Apr. 19, 2002

(65) Prior Publication Data

US 2002/0175853 A1 Nov. 28, 2002

(30) Foreign Application Priority Data

Apr. 23, 2001 (FR) .............................. 0105447

(51) Int. Cl.$^7$ .............................. G01S 5/02; H04B 7/185
(52) U.S. Cl. .............................. 342/357.01; 342/357.16; 342/353; 342/453; 455/456
(58) Field of Search ........................ 342/357.01, 357.16, 342/353, 453; 455/456

(56) References Cited

U.S. PATENT DOCUMENTS

| | | |
|---|---|---|
| 4,839,656 A | 6/1989 | O'Neill et al. |
| 5,008,679 A | 4/1991 | Effland et al. |
| 6,018,312 A | 1/2000 | Haworth |
| 6,028,551 A | 2/2000 | Schoen et al. |
| 6,373,432 B1 * | 4/2002 | Rabinowitz et al. ... 342/357.16 |

FOREIGN PATENT DOCUMENTS

WO   WO 01/14902   1/2001

* cited by examiner

Primary Examiner—Theodore M. Blum
(74) Attorney, Agent, or Firm—Clark & Brody

(57) ABSTRACT

A method of determining the position of a transmitting beacon transmitting a signal to certain satellites in a constellation of satellites, which satellites in turn retransmit retransmitted signals to at least one detection ground station, wherein each of said ground stations is provided with at least one antenna whose directional characteristics do not make it possible to identify which satellite retransmitted any given retransmitted signal, and wherein the method implements the following steps:

a) computing position for all combinations associating signals with satellites that might correspond to retransmission of transmitted signals;

b) computing the position of the beacon for at least some of the satellite combinations, using the least squares method; and c) determining the combination which presents the smallest computation residue by the least squares method, the position of the transmitting beacon corresponding to this combination then being considered to be the position of the transmitting beacon.

4 Claims, 1 Drawing Sheet

METHOD FOR DETERMINING THE POSITION OF A TRANSMITTING BEACON

The present invention relates to a method of determining the position of a transmitting beacon which transmits a signal to certain satellites in a constellation of satellites which, in turn, retransmit retransmitted signals to terrestrial detection stations.

BACKGROUND OF THE INVENTION

When the terrestrial detection stations have directional receiver antennas pointed at the various satellites situated in the zone of visibility, then each retransmitted signal received is automatically associated with a satellite.

It is then possible to calculate the position of the transmitting beacon, in particular by the least squares method.

The drawback of such a method is that each ground station needs to be fitted with the same number of antennas as there are satellites whose signals are to be detected, and each antenna must also be provided with control apparatus suitable for ensuring that it tracks the satellite with which it is associated.

OBJECTS AND SUMMARY OF THE INVENTION

The invention seeks to simplify the ground installation by limiting the number of antennas.

For each ground station, the invention provides for implementing at least one, and preferably only one antenna suitable for receiving signals from a plurality of satellites situated in the visibility zone of that station.

Under such conditions, the retransmitted signals as received are no longer identified as coming from any particular satellite.

The idea on which the invention is based is to achieve such identification by computation.

The invention thus provides a method of using the least squares method to determine the position of a transmitting beacon transmitting a signal to certain satellites in a constellation of satellites, which satellites in turn retransmit retransmitted signals to at least one detection ground station, wherein at least one ground station is provided with at least one antenna, in particular an omnidirectional antenna, whose directional characteristics do not make it possible to identify which satellite retransmitted any given retransmitted signal, and wherein the method implements the following steps:

a) computing position for all combinations associating retransmitted signals received by said antenna with satellites of the constellation whose retransmitted signals are capable of being detected by said antenna;

b) computing the position of the beacon for at least some of the satellite combinations, using the least squares method; and c) determining the combination which presents the smallest computation residue by the least squares method, the position of the transmitting beacon corresponding to this combination then being considered to be the position of the transmitting beacon.

BRIEF DESCRIPTION OF THE DRAWING

The invention will be better understood on reading the following description given by way of non-limiting example and with reference to the accompanying drawing, in which.

MORE DETAILED DESCRIPTION

The invention is described below by way of example in the context of the GALILEO satellite constellation in which each satellite is fitted with a search and rescue (SAR) transponder. GALILEO is to be the European contribution to a global navigation satellite system (GNSS2). GALILEO presents 27 satellites (plus three active reserve satellites) orbiting at an altitude of 23,612 kilometers (km) and the system is intended to be operational in the year 2008.

The transponders of the satellites of the constellation relay signals transmitted at 406 megahertz (MHz) by COSPAS-SARSAT transmission beacons, and for this purpose they re-transmit signals at 1544 MHz.

The 1544 MHz signals transmitted by the on-board transponders are detected by the COSPAS-SARSAT terrestrial station system.

In the context of the present invention, it is proposed to simplify the ground stations so as to reduce the cost of installing them, of operating them, and of maintaining them, without degrading performance and without modifying the other elements of the system.

Figure 1:
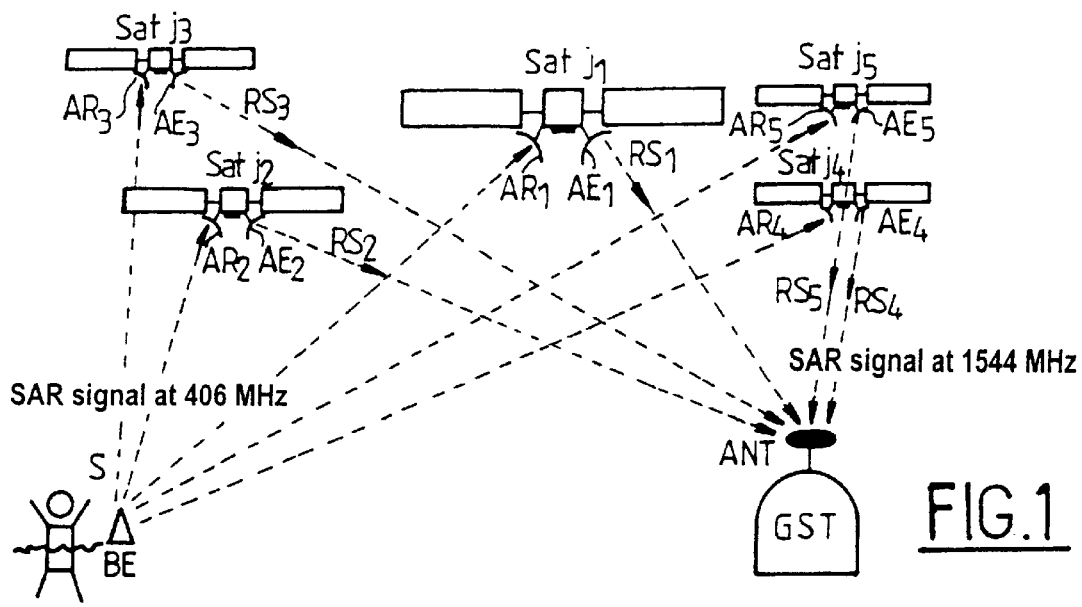
FIG. 1 shows a system of the invention, with one receiver station being shown.

As shown in FIG. 1, a transmitting beacon, e.g. an emergency or distress beacon BE transmits signals S of the SAR type at 406 MHz. These signals are received by satellites $Sat_{j1}$, $Sat_{j2}$, . . . , $Sat_{j5}$, each of which is provided with a receiver antenna $AR_1$, $AR_2$, . . . , $AR_5$, a transponder, and a transmitter antenna $AE_1$, $AE_2$, . . . , $AE_5$ for retransmitting signals $RS_1$, $RS_2$, $RS_3$, $RS_4$, and $RS_5$ at 1544 MHz towards one or more ground stations GST. The said ground station GST has an antenna ANT which receives these signals. As mentioned above, the signals received come from all of the above-specified satellites, e.g. five of them, and for each signal there is no way of telling which satellite retransmitted it.

To determine the exact position of the transmitting beacon BE, it is necessary to associate each retransmitted signal with the satellite that generated it.

Given that the path lengths between the beacon BE and the station GST via the satellites are different for each satellite, the signals reach the ground station GST at different instants.

Figure 3:
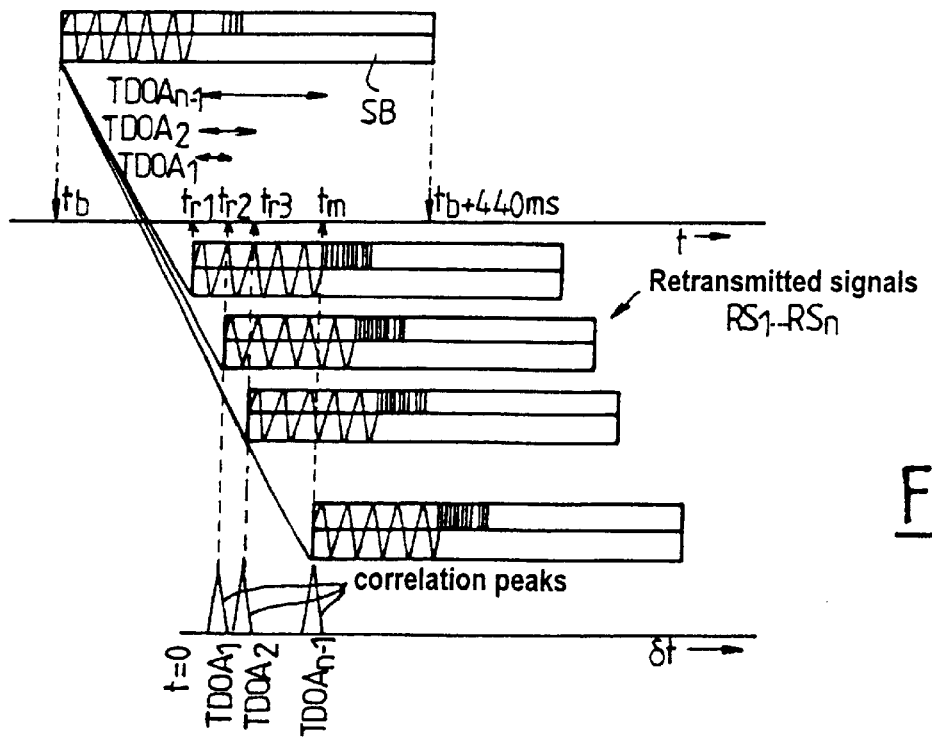
FIG. 3 illustrates a preferred embodiment of a signal correlator implemented by the above-specified detection module.

This produces interference between the signals. After reception, the signal block SB which contains the signals corresponding to a single transmitted block SE coming from a beacon BE is copied and then time shifted (and/or frequency shifted) until autocorrelation is obtained (see FIG. 3). This leads to correlation peaks which indicate the various time differences of arrival (TDOA). By way of example, a frequency measurement of the Doppler shifts of the signals can be implemented for this purpose. At least four time differences of arrival TDOA are necessary in order to be able to locate a transmitting beacon BE.

Because only one receiver antenna ANT is used, the signals it picks up are not associated with the respective particular satellites that retransmitted them.

To resolve this problem, a potential position is computed for the beacon BE, by means of the least squares method, and this is done for each possible combination.

If the number of satellites "visible" to the station GST is written $\underline{n}$, and if the number of received signals is written $\underline{m}$, then the number of possible combinations is equal to m!×n/m which, in the common case of n=m, amounts to n! combinations.

For n=m=5 there are 120 possible combinations.

The correct combination can be determined by computing the computation residue for each case using the least squares method. For all combinations that do not correspond to the real situation, the value of this residue is very considerably higher than when the signals are correctly associated with the satellites that have retransmitted them, and can be higher by several orders of magnitude, for example.

Thus, when the signals are correctly associated with the satellites, there is a drop in the value of the residue, thus making it possible to specify the good combination on the basis of which the position data enables the transmitting beacon BE to be located.

Because there is a very large difference between the value of the residue for the "good" combination compared with its value for all the other combinations, there is no need actually to compute all of the possible combinations. It suffices to compute positions corresponding to different combinations and to stop computing once a significant drop is obtained in the value of the residue.

Another method of simplifying the computation is to seek a combination of satellites and signals that correspond to the minimum number of signals necessary for obtaining the result, and then to refine the result with the remainder of the signals.

For three-dimensional (x, y, z) detection it is necessary to have five received signals, whereas four signals suffice for detection that is two-directional only (where it is assumed, for example, that the beacon is at ground level, i.e. z=0).

Figure 2:
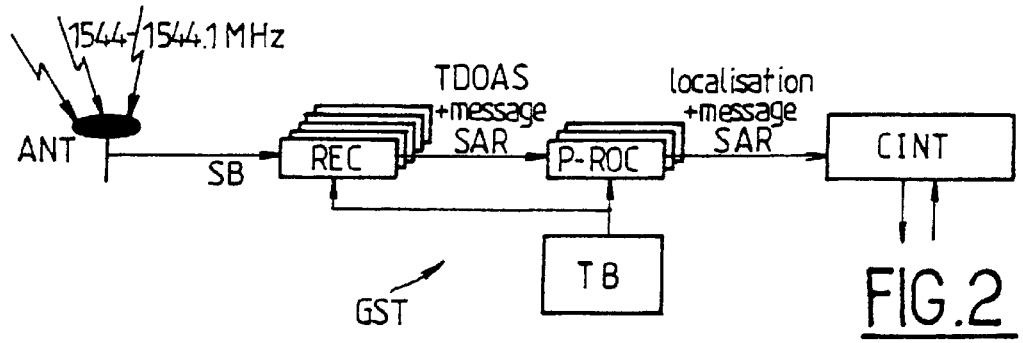
FIG. 2 is a functional diagram of the detection module of the receiver station.

An implementation of the invention using the least squares method is explained below:

FIG. 2 shows an architecture for the receiver module of the invention. The antenna ANT relays the signals it receives in the 1544 MHz to 1544.1 MHz band to a receiver REC which has 20 reception channels, for example, thus enabling it to process a plurality of signal blocks SB each coming from a combination of satellites. The receiver REC is provided with software means for generating the above-mentioned signals $TDOA_1$, $TDOA_2$, ..., $TDOA_n$ by autocorrelation, and also for generating any SAR messages that might have been transmitted by the beacon BE.

A process PROC receives the TDOA signals and the SAR messages and proceeds with locating the beacon BE using the above-described method, i.e. by initially testing possible combinations of signals with satellites, e.g. using computation processors in parallel, and then determining which is the real combination. The localization signals and the SAR messages are forwarded to a communications interface CINT. It should also be observed that there is an absolute time and frequency base TB clocking the processors PROC and the receiver REC.

Localization can be performed as follows:

A file of the GALILEO system ephemerides contains the orbital parameters of the satellites in the GALILEO constellation. This file is supplied by the GALILEO system control center. The satellites also transmit a somewhat less accurate version of the same file. The coordinates of the satellites, of the ground station GST, e.g. using the MEOLUT standard (where COSPAS/SARSAT local user terminals (LUT) receive signals from a constellation in mean earth orbit (MEO)), and the position of the transmitting beacon BE can be converted at all times into earth centered, earth fixed (ECEF) coordinates, whereupon pseudo-range vectors are computed for the satellite to the ground station.

The positions of the satellites are then converted into relative vectors NED characterizing their positions relative to the ground station GST (MEOLUT). Data is conserved only for satellites which present an angle of elevation greater than some minimum angle (e.g. 10°) and which are considered as being capable of acting as a transponder for the SAR signal from a transmitting beacon BE.

The various measured time differences $TDOA_1$, ..., $TDOA_n$ can be forwarded as times of arrival TOA. This introduces a time offset $t_{bias}$ which is the same for each signal in a block SB received by the antenna ANT. This time offset $t_{bias}$ is defined as the time at which the signal block SB was transmitted by the beacon BE.

This gives:

$$TOA_m = TDOA_{m-1} + t_{bias}$$

thus:

$TOA_1 = t_{bias}$ $TOA_2 = TDOA_1 + t_{bias}$, and so on.

The arrival time vector is then multiplied by the speed of light to give the measured distance to the satellite as follows:

$$P_{rb}^{j*} = TOA \times c = TDOA_{m-1} \times c + t_{bias} \times c$$

The pseudo-range P is measured from the beacon $BE_b$ via a satellite $SAT_j$ to the ground station $GST_r$.

These measured values P represent the path length differences between the various paths that the SAR signals have travelled plus a constant value as defined above. This value is of no particular importance since it contributes to all the other constants when applying the least squares method. This gives:

$$P_{rb}^{j*} = P_{rb}^{j} + P_{bias}$$

or $$P_{rb}^{j} = P_{rb}^{j*} - P_{bias}$$

which is the measured and adjusted pseudo-range between the beacon BE and the receiver via the satellite and is equal to the measured and adjusted travel time $t_{rb}^{j}$ multiplied by the speed of light c.

This gives:

$$P_{rb}^{j} = c t_{rb}^{(j)}$$

An emergency beacon BE transmits a distress signal at instant $t_b$. The satellite $SAT_j$ receives this signal at instant $t^j$ and its transponder relays it to the ground after a transfer time $dt^j$. This signal is received at the ground station $GST_r$ at instant $\delta_{tr}$.

The transit time for the signal between the beacon $BE_b$ and the receiver GST via the satellite $SAT_j$ can be written:

$$E\{t_{br}^{(j)}\} = t_r^j - t_b - \delta t^j = \frac{\|x_b - x^j\|}{c} + \frac{\|x^j - x_r\|}{c}$$

Taking account of the time offset $ST_b$ which can exist between the beacon $BE_b$ and the ground station $GST_r$, the relationship between the real time t' and the measured time t is as follows:

$$t_b = t_b + \delta t_b$$

and $t_r = t'_r + \delta t_{tr}$ $$\frac{\|x_b - x^j\|}{c} + \frac{\|x^j - x_r\|}{c}$$

respectively for the beacon $BE_b$ and for the station $GTS_r$.
The measured and adjusted time is then:

$$E\{t_{br}^{(j)'}\} = E\{t_r^{(j)'} - t'_b\} = \frac{\|x_b - x^j\|}{c} + \frac{\|x^j - x_r\|}{c} + (\delta t_b - \delta t_r - \delta t^j)$$

The equation which defines the measured transit time extending between the beacon and the satellite is then:

$$E\{t_b^{j'}\} = E\{t_{br}^{(j)'}\} - \frac{\|x^j - x_r\|}{c} - \delta t^j = \frac{\|x_b - x^j\|}{c} + (\delta t_b - \delta t_r)$$

The position $x^j$ of the satellite is that which corresponds to the satellite receiving the signal. This position can be determined by iteration:

$$x^j = x^j(t^{j'})$$

$$t^{j'} = t'_r - \frac{\|x^j - x_r\|}{c} - \delta t_r.$$

By multiplying by the speed of light, the travel times are converted into ranges. This gives:

$$E\{ct_{br}^{(j)'}\} - \|x^j - x_r\| - c\delta t^j = \|x_b - x^j\| + c(\delta t_b - \delta t_r)$$

However, since the measured pseudo-ranges and the corrected pseudo-ranges differ by a constant offset only, i.e.:

$$ct_{rb}^{(j)'} = P_{rb}^{j'} = P_{rb}^{j*} - P_{bias}$$

the equation reduces to:

$$E\{P_{rb}^{j*}\} - \|x^j - x_r\| - c\delta t^j = \|x_b - x^j\| + c(\delta t_b - \delta t_r) + P_{bias}$$

The transponder delay is measured for each satellite on launch. In the description below, its value is taken to be zero, since these time delays and other variations can be taken into consideration as a single known fixed value $x_{bias}$.
This gives:

$$E\{P_{br}^{j*}\} - \|x_r^j\| = \|x_b - x^j\| + x_{bias}$$

This equation characterizes the range between the beacon $BE_b$ and the satellite $SAT_j$ relative to the measured pseudo-ranges, the range between the receiver $GST_r$ and the satellite $SAT_j$, and the offsets or delays due to the system.

This equation presents three unknowns which are the positions (x, y, z) and an offset which is not known. To solve the equation, it is linearized:

$$E\{\Delta P_{br}^{j*}\} = \overline{e}_b^{jT} \Delta x_b + \Delta x_{bias}$$

with:

$$\overline{e}_b^{jT} = \left( \frac{x_b - x^j}{\|x_b - x^j\|}, \frac{y_b - y^j}{\|y_b - y^j\|}, \frac{z_b - z^j}{\|z_b - z^j\|} \right)$$

To simplify computation, the observation equation is written in the following form:

$$E\{\underline{y}\} = Ax$$

with $$A = \begin{bmatrix} \alpha_{11} & \alpha_{12} & \alpha_{13} & 1 \\ \alpha_{21} & \alpha_{22} & \alpha_{23} & 1 \\ \alpha_{31} & \alpha_{32} & \alpha_{33} & 1 \\ \alpha_{i1} & \alpha_{i2} & \alpha_{i3} & 1 \\ \vdots & \vdots & \vdots & \vdots \\ \alpha_{m1} & \alpha_{m2} & \alpha_{m3} & 1 \end{bmatrix} \text{ and } x = \begin{bmatrix} \Delta x \\ \Delta y \\ \Delta z \\ \Delta x_{bias} \end{bmatrix}$$

$$\alpha_{i1} = \frac{x_b - x^j}{\|x_b - x^j\|} \quad \alpha_{i2} = \frac{y_b - y^j}{\|y_b - y^j\|} \quad \alpha_{i3} = \frac{z_b - z^j}{\|z_b - z^j\|}$$

E is the expected value of $\underline{y}$, the vector of the "measured" stochastic path length differences, with:

$$\underline{y} = \Delta P_{br}^{j*} = TDOA \cdot c.$$

A is referred to as the direction matrix, and $\underline{x}$ as the range vector. $\underline{i}$ is the index of a detected signal coming from the beacon $BE_b$, and $\underline{m}$ is the total number of signals. There must be at least m=4 detected signals. An additional satellite is needed to raise the ambiguity on the relationship between the signals and the satellites and to determine the correct signal-satellite combination. It is therefore necessary for $m \geq 5$ in order to obtain correct position in three dimensions $\underline{x}, \underline{y}, \underline{z}$.

In most cases, it can nevertheless be assumed that the beacon BE is on the ground so there is no need to determine the $\underline{z}$ coordinate. Under such circumstances, there need only be m=4 signals retransmitted by the satellites.

After being linearized, the observation equation can be solved by the least squares method (as is the case for a GPS system).

This gives:

$$\hat{\underline{x}} = (A^T Q_y^{-1} A)^{-1} A^T Q_y^{-1} \underline{y} = (A^T A)^{-1} A^T \underline{y}$$

the dispersion D in terms of the variance $Q_y$ of $\underline{y}$ being given by:

$$Q_y = D\{\underline{y}\} = \sigma_0^2 I$$

This gives a solution for the location of the beacon and for the offset to be determined, with the solution then being tested by computing the residue of the least squares method, i.e.:

$$\hat{e} = \underline{y} - A\hat{x}$$

These residues are small if the "triangulation" error is small.
The following test can be performed:

$$\hat{\sigma}^2 = \frac{\hat{e}^T \hat{e}}{m - 3}$$

For positioning in two dimensions.
For positioning in three dimensions, the denominator becomes (m−4).

The number $\sigma^2$ is representative of the accuracy of the computed position. If all the pseudo-ranges converge on a point, then $\sigma^2 = 0$.

As a general rule this is not the case because of small systematic errors due to the ionosphere. In which case, $\sigma^2$ is of the order of a few hundreds of square meters ($m^2$). If the computed combination is not the good combination, then the systematic error is very high, of the order of $10^5$ $m^2$, given that the distances are calculated on the basis of satellites which are associated with signals that they have not retransmitted.

As a result, it suffices to set a threshold experimentally, e.g. on the basis of beacons located at various points whose positions are known in advance, and thereafter in real cases (where the position of the beacon BE is unknown) to continue computing signal-satellite combinations until the value of the residue drops below the threshold.

What is claimed is:

1. A method of using the least squares method to determine the position of a transmitting beacon transmitting a signal to certain satellites in a constellation of satellites, which satellites in turn retransmit retransmitted signals to at least one detection ground station, wherein at least one ground station is provided with at least one antenna, in particular an omnidirectional antenna, whose directional characteristics do not make it possible to identify which satellite retransmitted any given retransmitted signal, and wherein the method implements the following steps:

a) computing position for all combinations associating retransmitted signals received by said antenna with satellites of the constellation whose retransmitted signals are capable of being detected by said antenna;

b) computing the position of the beacon for at least some of the satellite combinations, using the least squares method; and c) determining the combination which presents the smallest computation residue by the least squares method, the position of the transmitting beacon corresponding to this combination then being considered to be the position of the transmitting beacon.

2. A method according to claim 1, wherein said position computation is performed for combinations associating signals and satellites until said computed residue has a value below a threshold.

3. A method according to claim 1, wherein position computation is performed for all of said combinations associating signals with satellites.

4. A method according to claim 1, including a preliminary step of discriminating the received retransmitted signals by autocorrelation.

* * * * *